(12) United States Patent
Maruyama

(10) Patent No.: US 7,086,630 B2
(45) Date of Patent: Aug. 8, 2006

(54) FASTENER FOR A PIPE OR SIMILAR OBJECT

(75) Inventor: Toshio Maruyama, Toyohashi (JP)

(73) Assignee: Newfrey LLC, Newark, DE (US)

( * ) Notice: Subject to any disclaimer, the term of this patent is extended or adjusted under 35 U.S.C. 154(b) by 0 days.

(21) Appl. No.: 10/968,285

(22) Filed: Oct. 20, 2004

(65) Prior Publication Data

US 2005/0092870 A1 May 5, 2005

(30) Foreign Application Priority Data

Oct. 30, 2003 (JP) ............................ 2003-370667

(51) Int. Cl.
*F16B 15/00* (2006.01)
*F16B 45/00* (2006.01)
(52) U.S. Cl. .................. 248/71; 248/68.1; 248/74.2
(58) Field of Classification Search .................. 248/71, 248/68.1, 73, 74.2, 48
See application file for complete search history.

(56) References Cited

U.S. PATENT DOCUMENTS

| | | | | |
|---|---|---|---|---|
| 5,460,342 A | * | 10/1995 | Dore et al. ................. | 248/74.2 |
| 5,947,426 A | * | 9/1999 | Kraus ......................... | 248/74.2 |
| 5,954,300 A | * | 9/1999 | Sturies et al. .............. | 248/68.1 |
| 6,073,891 A | | 6/2000 | Humber ...................... | 248/74.5 |
| 6,206,330 B1 | * | 3/2001 | Oi et al. ...................... | 248/68.1 |
| 6,241,198 B1 | * | 6/2001 | Maruyama .................... | 248/49 |
| 6,290,201 B1 | * | 9/2001 | Kanie et al. ................. | 248/636 |
| 6,450,459 B1 | * | 9/2002 | Nakanishi ................... | 248/68.1 |
| 6,585,196 B1 | * | 7/2003 | Nakanishi ................... | 248/68.1 |
| 6,883,762 B1 | * | 4/2005 | Miura et al. ................ | 248/74.2 |

FOREIGN PATENT DOCUMENTS

| | | |
|---|---|---|
| FR | 2 547 368 | 12/1984 |
| JP | 10-122433 | 5/1998 |
| JP | 11-280952 | 10/1999 |
| WO | 02/097315 | 12/2002 |
| WO | WO 02/097315 | 12/2002 |

\* cited by examiner

*Primary Examiner*—Amy J. Sterling
(74) *Attorney, Agent, or Firm*—Miles & Stockbridge P.C.

(57) ABSTRACT

A fastener 1 in which a base 6, pipe holders 7a–7d, a stud engaging portion 10 for engaging a stud on a support, and an anchor engaging portion 9 for engaging a mounting hole in a support are molded integrally, whereby slender objects such as pipes held by the pipe holders are fastened to a support. The anchor engaging portion 9 is molded in an anchor shape and comprises a rigid shank 15 extending downwards perpendicularly from the base 6. A pair of flexible legs 17 extend from the end of the shank towards the base and bend away from the shank for engaging an edge of a mounting hole in a support. The fastener can be manufactured by a simple die structure without a slide.

4 Claims, 4 Drawing Sheets

FASTENER FOR A PIPE OR SIMILAR OBJECT

CROSS-REFERENCE TO RELATED APPLICATION

This application claims the benefit of Japanese Patent Application No. 2003-370667 filed Oct. 30, 2003, incorporated herein by reference.

BACKGROUND OF THE INVENTION

The present invention relates to a fastener in which a base, fastening portion and mounting portion for mounting the fastener on a support, such as a car body or bracket, are molded integrally, and in which a slender object such as a pipe held by the fastener can be mounted on the support.

Fasteners for pipes in which a base, fastening portion and mounting portion for mounting the fastener to a car body or bracket are molded integrally and in which the fastener mounts a pipe to a car body, are disclosed in Kokai No. 10-122433 (Patent Document 1), International Application Publication No. WO 02/097315 (Patent Document 2), and Kokai No. 11-280952 (Patent Document 3). In the fastener for pipes described in Patent Document 1, the mounting portion comprises a stud engaging portion able to engage a stud bolt fixed to a car body and a bracket engaging portion able to be inserted into a mounting hole in a bracket to mount the fastener on the bracket. This allows the fastener to be mounted either to a car body or a bracket. Patent Document 2 discloses a fastener having a structure that obstructs transmission of vibrations from a pipe to a car body and from the car body to the pipe. The fastener has, as a mounting portion, a stud engaging means able to engage a stud bolt fixed to the car body and a panel engaging means able to be inserted into a mounting hole on another panel and engaging the panel. Patent Document 3 discloses a fastener for a pipe, with elastic tabs on the bottom surface of a holding portion that are able to push up and hold a pipe properly even when the outer diameter of the pipe accommodated by the holding portion varies. The fastener has a stud engaging portion for engaging a stud extending outward from a car body, but does not have another mounting means as in the case of the fasteners in Patent Document 1 and Patent Document 2.

The fastener described in Patent Document 1 is equipped with a stud engaging portion and a bracket engaging portion. The bracket engaging portion consists of two hook-shaped pawls disposed opposite the base of the fastener at a particular interval. Because the two pawls are formed apart from one another, there is a chance that only one pawl will go into the mounting hole on the bracket, making the bracket mounting operation less efficient. Another problem is that the hole through which the end of the stud passes from the stud engaging portion between the two pawls may not be molded in the base portion between the pawls, and so a slide has to be added during the molding process, which increases the cost of the product. The fastener in Patent Document 2 has a stud engaging portion and a panel engaging portion. The panel engaging portion is cube-shaped, having a square profile with elastic pawls extending from two sides to engage a mounting hole in the panel. However, a slide has to be added during the molding process, which increases the cost of the product. The fastener in Patent Document 3 only has a stud engaging portion and cannot be mounted on a panel or bracket via a mounting hole.

BRIEF DESCRIPTION OF THE INVENTION

The present invention provides a fastener for pipes or similar objects in which the fastener can be attached either to a stud on a support or a mounting hole in a support, and in which a die structure for molding can be simplified.

In a preferred, but non-limiting embodiment of the present invention, a fastener comprises a base, a fastening portion and a mounting portion molded integrally, whereby a slender object such as a pipe fastened to the fastening portion can be mounted on a support. The mounting portion comprises a stud engaging portion for engaging a stud extending outward from the support, allowing the fastener to be mounted on the support, and an anchor engaging portion allowing the fastener to be mounted on the support by inserting the anchor engaging portion into a mounting hole in the support. The anchor engaging portion is molded in an anchor shape and comprises a rigid shank extending from the base and a pair of flexible legs extending from an end of the shank towards the base and bending away from the shank for engaging an edge of a mounting hole in a support. By virtue of the construction of the fastener, a slide is not required during the molding process, and the cost of the product does not increase.

Preferably, the stud engaging portion is disposed on the base adjacent to the anchor engaging portion so as to form a stud receiving hole extending in a direction opposite to the shank. A plurality of opposing flexible pawls are molded near the mouth of the stud receiving hole and are inclined to the stud insertion direction so as to engage thread grooves or circumferential grooves in the stud. The stud receiving hole is molded so as to be narrower over an interval near the tip of the stud than over an interval where the pawls are located. In this way, a stud can be easily accommodated and, when the stud is received deeply in the hole, it can be mounted securely regardless of variations in the stud. Because the pawls keep the stud in the proper engaged position, strong mounting force can be maintained.

Preferably, the fastening portion comprises a curved housing portion forming a space for holding a slender object, and an elastic fastening tab for applying pressure from the upper end of the curved housing portion to a side surface of the slender object inside the curved housing portion. An elastic tab is formed on the bottom surface of the curved housing portion for pushing up the housed slender object in order to bring the slender object into contact with the elastic fastening tab at the upper end of the curved housing portion. Ideally, the elastic tab on the bottom surface of the curved housing portion should be molded so as to extend lengthwise with respect to the slender object to be housed, with ends of the tab elastically pushing up on the slender object. In this way, fastening force is maintained regardless of the outer diameter of the slender object being fastened.

In addition, a pair of ribs can be formed integrally at certain positions lengthwise in the curved housing portion to urge side surfaces of the housed slender object into contact with the elastic tabs, so that constant resistance pressure can be maintained on the slender object in a sliding direction.

BRIEF DESCRIPTION OF THE DRAWINGS

The invention will be further described in conjunction with the accompanying drawings, which illustrate a preferred (best mode) embodiment, and wherein.

DETAILED DESCRIPTION OF THE INVENTION

Figure 1:
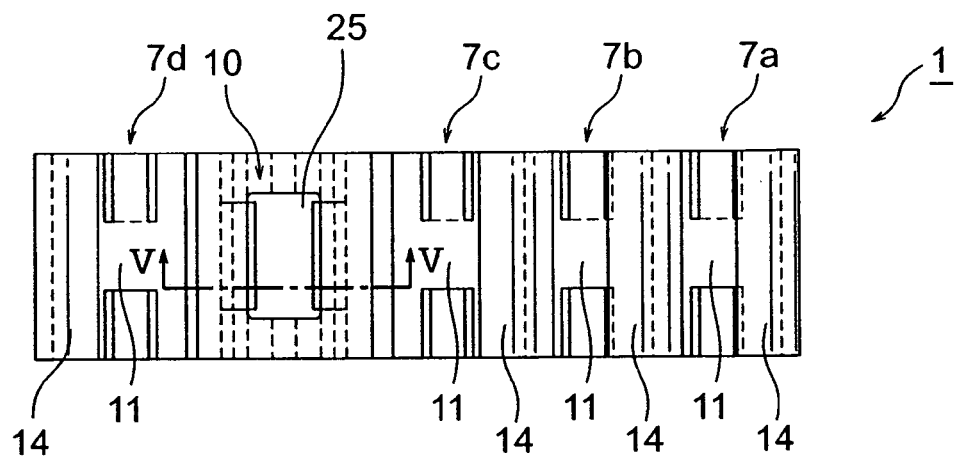
FIG. 1 is a plan view of the fastener for a pipe or similar object in a first example of the present invention.
Figure 2:
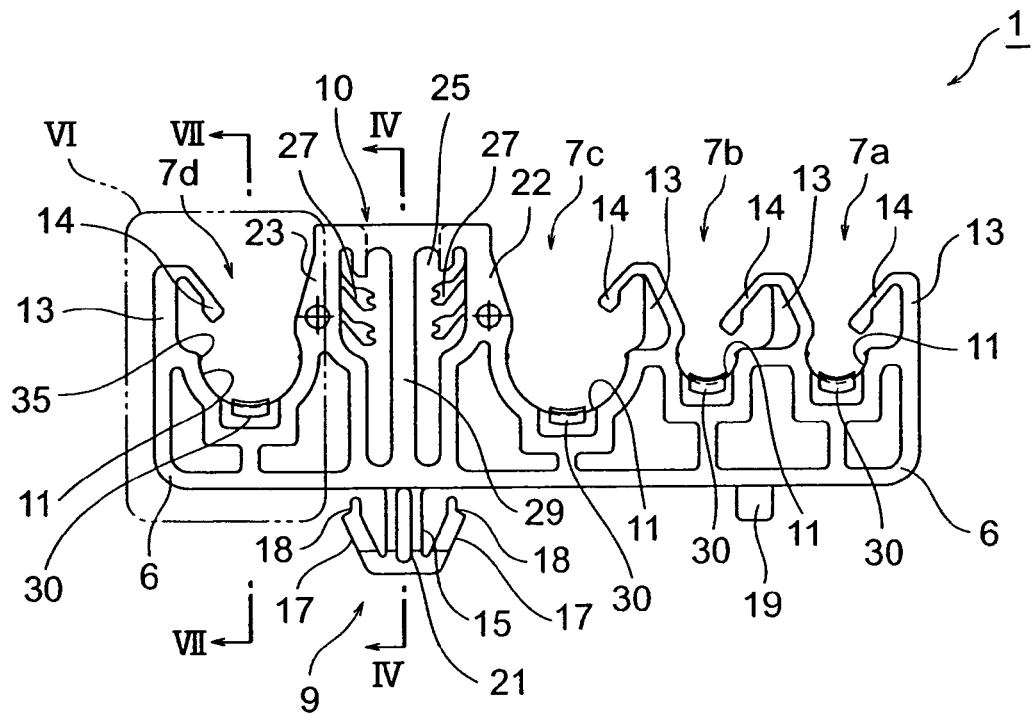
FIG. 2 is a front view of the fastener in FIG. 1.
Figure 3:
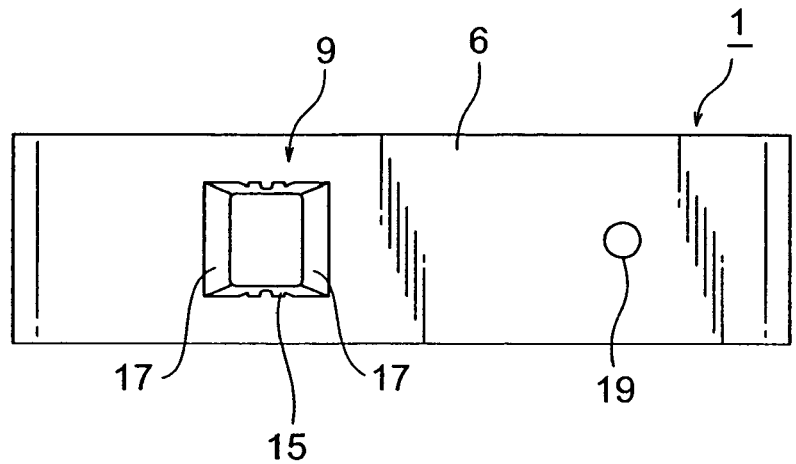
FIG. 3 is a bottom view of the fastener in FIG. 1.

As shown in FIG. 1 through FIG. 3, a fastener 1 is of the invention is a plastic integrally molded product. In this fastener 1, a base 6, pipe holders 7a–7d, anchor engaging portion 9 for mounting the fastener on a support, and a stud engaging portion 10 are all molded integrally. The base 6 is elongated so that a plurality of pipes can be fastened in parallel fashion in the pipe holders 7a–7d, and the stud engaging portion 10 is formed between pipe holders 7c and 7d to receive and engage a stud.

The pipe holding portion 7 can be molded to hold brake fluid lines or fuel oil lines, for example. A holding portion 11 comprising a bottom surface of the pipe holding portions 7, 9 is molded in a curved shape to contact side surfaces of pipes substantially along half their circumference. One of the walls 13 of the curved holding portion 11 extends upwards, and an elastic holding tab 14 bent at an incline towards the bottom surface of the curved holding portion 11 extends from the tip of the wall. This pushes down on a side surface of a housed pipe from above.

Figure 4:
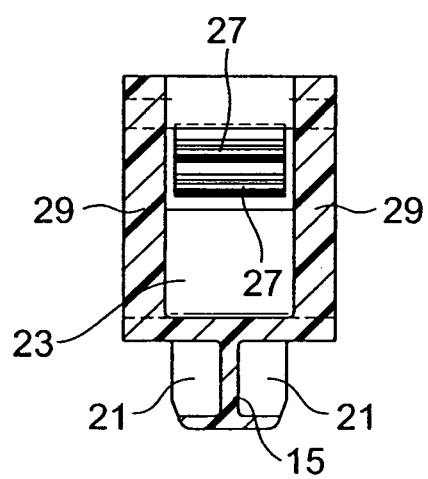
FIG. 4 is a cross-sectional view of the fastener in FIG. 2 from line IV—IV.
Figure 5:
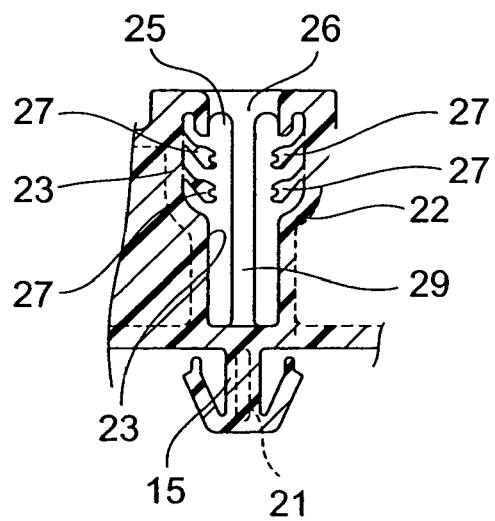
FIG. 5 is a cross-sectional view of the fastener in FIG. 1 from line V—V.

The anchor engaging portion 9, as shown best in FIG. 2, is molded in an anchor shape and comprises a rigid plate-like shank 15 extending downwards perpendicularly from the base 6 and a pair of flexible legs 17 bending from the end (bottom end) of the shank 15 towards the base 6 and extending at an incline away from the shank 15. Shoulders 18 are formed on the tips of the legs 17 to engage an edge of a mounting hole in a support such as a panel. As shown in FIG. 3 through FIG. 5, the shank 15 and legs 17 are formed in plate-like fashion with a constant width lengthwise (vertically in FIG. 3) with respect to pipes being held. As shown in FIG. 3, the bottom surface of the shank 15 is square. As a result, if the mounting hole in the support is square, the shank can be prevented from rotating. A protrusion 19 is formed on the base 6 at a position away from the anchor engaging portion 9 in order more securely to prevent rotation after mounting, and holes are formed in the support preferably in two places corresponding to the anchor engaging portion 9 and the protrusion 19. As shown in FIG. 4 and FIG. 5, spaces 21 are formed in the shank 15 extending from the center. This reduces the weight of the shank 15, and prevents warping during the cooling process after molding. In this way, a simple structure is created that can be molded using two split dies, and a slide is not needed in the dies during the molding process.

The stud engaging portion 10 is molded so as to extend opposite to the anchor engaging portion 9 on the base 6 between pipe holding portion 7c and pipe holding portion 7d. The stud engaging portion 10 uses the base 6, side wall 22 of pipe holding portion 7c and side wall 23 of pipe holding portion 7d to form a stud receiving hole 25. The stud receiving hole 25 extends opposite to the shank 15 of the anchor engaging portion 9. As seen in the plan view of FIG. 1, the stud receiving hole 25 is molded in rectangular cross-section. Several pairs of pawls 27 are formed so as to extend at an incline with respect to the stud insertion direction at a position near the mouth 26 (FIG. 5) of the stud receiving hole 25 and interlock with thread grooves or circumferential grooves on a stud. The interlocking force of these pawls 27, as shown in the figure, can be increased if molded in a double pawl shape to interlock with two thread grooves or circumferential grooves on the stud.

The stud receiving hole 25 is molded so as to have a portion narrower over a considerable interval than a portion containing the pawls 27 and having parallel walls extending from a position near tips of the engaging pawls 27 to a position near the base 6 (the bottom portion of FIG. 2 and FIG. 5). In this way, when a stud is inserted deeply in the stud receiving hole 25, it can be mounted securely in the fastener 1 regardless of variations in the stud. Because the pawls 27 properly engage the thread grooves or circumferential grooves in the stud, strong mounting force can be maintained. Central columns 29 can be formed at opposite sides of the stud receiving hole, as shown in FIG. 4 for strengthening the stud engaging portion 10. A plurality of fasteners 1 can be fastened to pipes and mounted easily on a plurality corresponding studs at a staggered pitch.

Figure 6:
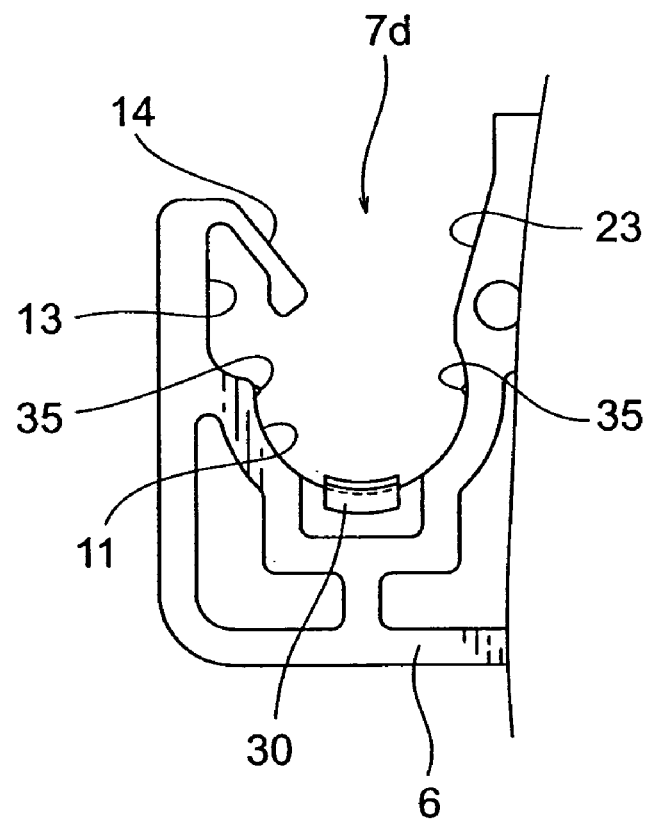
FIG. 6 is an enlarged view of the portion bounded by line VI in FIG. 2.
Figure 7:
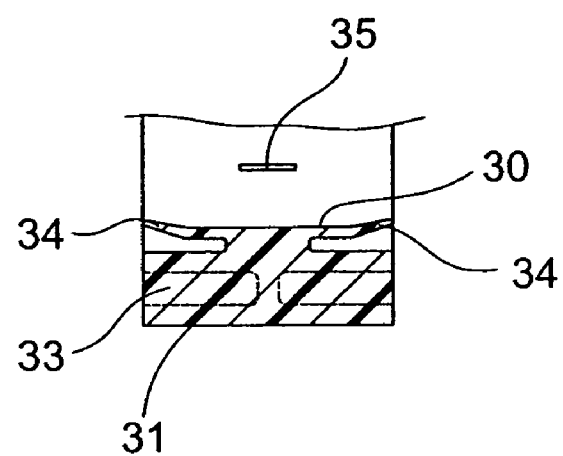
FIG. 7, is a fragmentary cross-sectional view of the fastener in FIG. 2 from line VII—VII.

As shown in FIG. 2, FIG. 6 and FIG. 7, an elastic tab 30 is provided on the bottom surface of the curved housing portion 11 to urge a housed pipe into contact with an elastic fastening tab 14. The elastic tab 30, as shown in FIG. 7, is slender and extends lengthwise with respect to the pipes (left to right in FIG. 7).

The central portion 31 of the tab 14 is integrated with portion 33 of the curved housing portion at the bottom, and both lengthwise ends 34 are raised up somewhat to elastically apply upward pressure on a pipe. In this way, the pipes can be pushed towards the elastic tabs 14, and constant pipe retaining pressure can be maintained despite variations in the outside diameters of the pipes.

Also, as shown in FIG. 6 and FIG. 7, elongated elastic ribs 35 are formed integrally at certain positions lengthwise in the curved housing portion 11 to bring side surfaces of a housed pipe into contact with the bottom surface of the curved housing portion (the position of the elastic tab 30) and the elastic fastening tab 14. In this way, constant resistance can be maintained on the pipes lengthwise in the sliding direction to prevent sliding.

Figure 8:
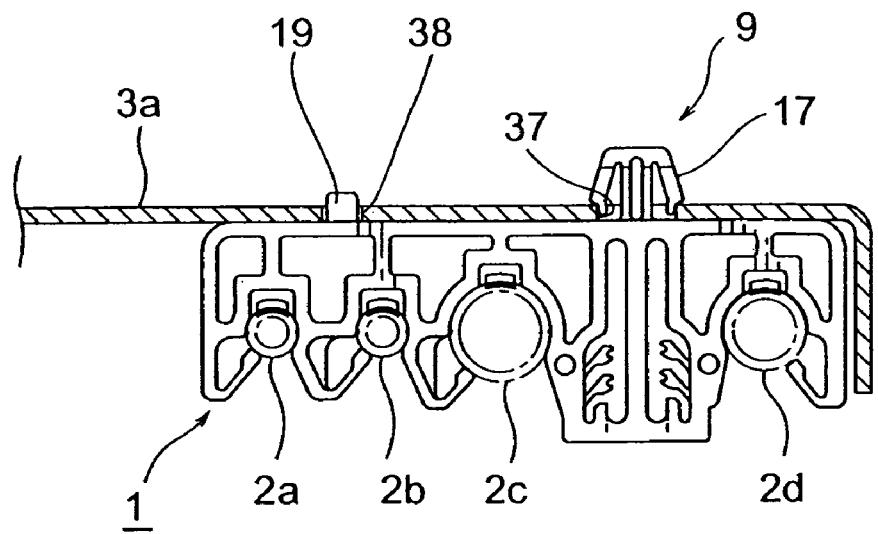
FIG. 8 is a cross-sectional view of the fastener in FIG. 2 shown holding a plurality of pipes and mounted on a support such as a panel or bracket.

FIG. 8 shows a fastener 1 holding a plurality of pipes 2a–2d mounted on a support 3a such as a panel or bracket using the anchor engaging portion 9. The legs 17 on the anchor engaging portion 9 engage an edge of the mounting hole 37 in the support 3a. The protrusion 19 in the base 6 is inserted into another hole 38 in the support 3a to reliably prevent rotation of the fastener 1.

Figure 9:
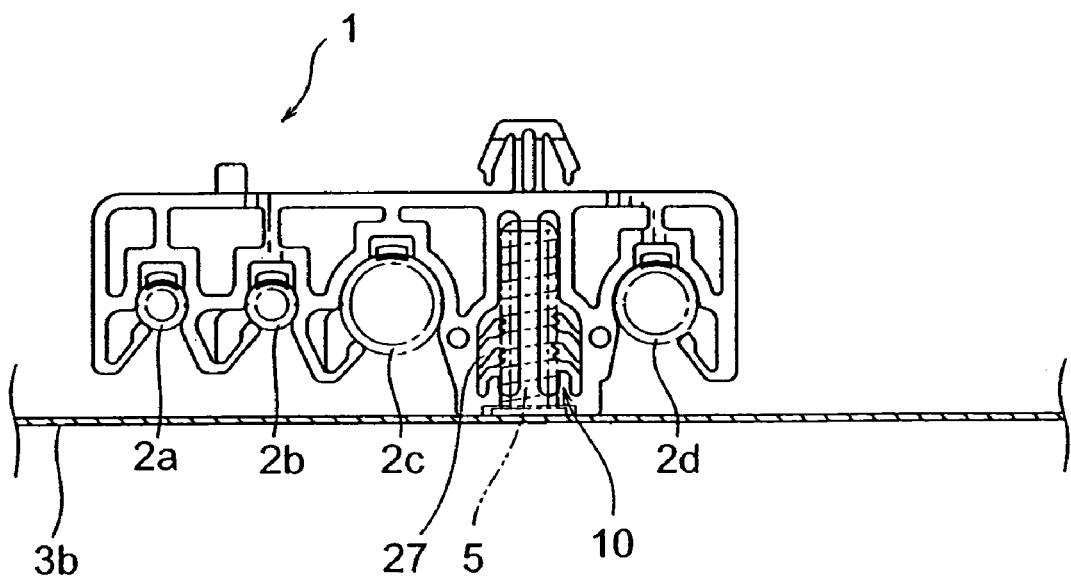
FIG. 9 is a cross-sectional view of the fastener in FIG. 2 shown holding a plurality of pipes and mounted on a support such as a car body with a stud extending outward perpendicularly.

FIG. 9 shows a fastener 1 holding a plurality of pipes 2a–2d mounted on a support 3b such as a car body with a stud 5 extending outwards, using the stud engaging portion 10. When the pawls 27 of the stud engaging portion 10 engage thread grooves or circumferential grooves in the stud 5, and the stud 5 is received deeply into the stud receiving hole 25, the narrowed receiving hole portion properly maintains the stud 5 in the mounted position regardless of variations in the stud, and the pawls 27 remain engaged with the thread grooves or circumferential grooves in the stud 5 with strong mounting force. In this way, the fastener can be mounted on a stud extending from a support such as a car body or can be mounted inside a mounting hole in a support such as a panel.

While a preferred embodiment of the invention has been shown and described, it will be apparent that changes can be made without departing from the principles and spirit of the invention, the scope of which is defined in the following claims.

What is claimed is:

1. A fastener constituted by an integral plastic molding for mounting a slender object on a support, comprising a base, a fastening portion and a mounting portion, wherein the mounting portion comprises a stud engaging portion for engaging a stud extending outward from a support, allowing the fastener to be mounted on the support, and an anchor engaging portion allowing the fastener to be mounted on a support, and wherein the anchor engaging portion is molded in an anchor shape and comprises a rigid shank extending downwards perpendicularly from the base and a pair of flexible legs extending from an end of the shank towards the base and bending at an incline away from the shank for engaging an edge of a mounting hole in the support, wherein the stud engaging portion is disposed on the base aligned with the shank of the anchor engaging portion and forms a stud receiving hole extending in a direction opposite to the shank, wherein a plurality of opposing flexible pawls are molded in a first portion of the stud receiving hole extending from a mouth of the stud receiving hole and extend at an incline to a stud insertion direction so as to engage thread grooves or circumferential grooves in the stud, and wherein the stud receiving hole is molded so as to have a second portion narrower than the first portion and having parallel walls extending over a substantial interval from the first portion to a position near the base, and wherein the second portion is devoid of pawls and is closed at the base.

2. A fastener described in claim 1, wherein the fastening portion comprises a curved housing portion forming a space for housing a slender object, and a first elastic tab for applying pressure from an upper end of the curved housing portion to a side surface of a slender object housed inside the curved housing portion, wherein a second elastic tab is formed on a bottom surface of the curved housing portion for pushing up on a housed slender object in order to bring the slender object into contact with the elastic tab, wherein the second elastic tab is molded so as to extend lengthwise with respect to the slender object to be housed, and wherein free ends of the second elastic tab elastically push up a housed slender object.

3. A fastener described in claim 2, wherein a pair of elongated elastic ribs are formed integrally at certain positions extending lengthwise in the curved housing portion to bring side surfaces of a housed slender object into contact with the elastic tabs.

4. A fastener constituted by an integral plastic molding for mounting a slender object on a support, comprising a base, a fastening portion and a mounting portion, wherein the mounting portion comprises a stud engaging portion for engaging a stud extending outward from a support, allowing the fastener to be mounted on the support, and an anchor engaging portion allowing the fastener to be mounted on a support, and wherein the anchor engaging portion is molded in an anchor shape and comprises a rigid shank extending downwards perpendicularly from the base and a pair of flexible legs extending from an end of the shank towards the base and bending at an incline away from the shank for engaging an edge of a mounting hole in the support, wherein the stud engaging portion is disposed on the base aligned with the shank of the anchor engaging portion and forms a stud receiving hole extending in a direction opposite to the shank, wherein a plurality of opposing flexible pawls are molded in a first portion of the stud receiving hole extending from a mouth of the stud receiving hole and extend at an incline to a stud insertion direction so as to engage thread grooves or circumferential grooves in the stud, and wherein the stud receiving hole is molded so as to have a second portion extending over a substantial interval from the first portion to a position near the base, and wherein the second portion is devoid of pawls and is closed at the base; and wherein the fastening portion comprises a curved housing portion forming a space for housing a slender object, and a first elastic tab for applying pressure from an upper end of the curved housing portion to a side surface of a slender object housed inside the curved housing portion, wherein a second elastic tab is formed on a bottom surface of the curved housing portion for pushing up on a housed slender object in order to bring the slender object into contact with the elastic tab, wherein the second elastic tab is molded so as to extend lengthwise with respect to the slender object to be housed, and wherein free ends of the second elastic tab elastically push up a housed slender object.

* * * * *